United States Patent
Kato et al.

(10) Patent No.: US 9,520,107 B2
(45) Date of Patent: Dec. 13, 2016

(54) KEYBOARD MUSICAL INSTRUMENT

(71) Applicant: Yamaha Corporation, Hamamatsu-Shi, Shizuoka-Ken (JP)

(72) Inventors: Tadaharu Kato, Hamamatsu (JP); Toshiro Sakai, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 14/479,617

(22) Filed: Sep. 8, 2014

(65) Prior Publication Data

US 2015/0068382 A1 Mar. 12, 2015

(30) Foreign Application Priority Data

Sep. 10, 2013 (JP) ................. 2013-187382

(51) Int. Cl.
| | | |
|---|---|---|
| *G10C 3/02* | (2006.01) | |
| *B29C 44/02* | (2006.01) | |
| *B29K 55/02* | (2006.01) | |
| *B29K 105/00* | (2006.01) | |
| *B29K 105/04* | (2006.01) | |
| *B29L 9/00* | (2006.01) | |
| *B29L 31/00* | (2006.01) | |

(52) U.S. Cl.
CPC ............. *G10C 3/02* (2013.01); *B29C 44/02* (2013.01); *B29K 2055/02* (2013.01); *B29K 2105/0005* (2013.01); *B29K 2105/04* (2013.01); *B29L 2009/00* (2013.01); *B29L 2031/758* (2013.01)

(58) Field of Classification Search
CPC .................... G10C 3/02; G10C 1/00
USPC ................................ 84/174, 179
See application file for complete search history.

(56) References Cited

U.S. PATENT DOCUMENTS

| | | | |
|---|---|---|---|
| 4,656,913 A | | 4/1987 | Yoshikawa |
| 5,183,955 A | * | 2/1993 | Calabrese et al. .............. 84/437 |
| 2005/0058824 A1 | | 3/2005 | Fujimoto |

FOREIGN PATENT DOCUMENTS

| | | | | |
|---|---|---|---|---|
| GB | 829858 A | | 3/1960 | |
| JP | U-A-57-155591 | | 9/1982 | |
| JP | 403063352 A | * | 3/1991 | .............. E04F 15/02 |
| JP | H03-039825 Y2 | | 8/1991 | |
| JP | 8-152874 A | | 6/1996 | |
| JP | 11-212541 A | | 8/1999 | |
| JP | 2000-158574 | | 6/2000 | |
| JP | 02000242273 A | * | 8/2000 | .............. G10H 1/32 |
| JP | 02002030674 A | * | 1/2002 | .............. E02D 27/01 |
| JP | 2003-122341 A | | 4/2003 | |
| JP | 2007-008002 | | 1/2007 | |
| JP | 2007-133249 | | 5/2007 | |

(Continued)

OTHER PUBLICATIONS

European Patent Office paper dated Nov. 5, 2015.

(Continued)

*Primary Examiner* — Kimberly Lockett
(74) *Attorney, Agent, or Firm* — Blank Rome LLP

(57) ABSTRACT

Provided is a keyboard musical instrument such as an acoustic piano or an electronic piano having an appearance and design similar to an acoustic piano, in which a fall board is made of a resin plate-shaped body, and hollow portions are provided inside the plate-shaped body. In addition, the plate-shaped body includes a plate-shaped resin foamed plate portion, and the hollow portions are made of plural air bubbles contained inside the resin foamed plate portion.

4 Claims, 3 Drawing Sheets

(56) References Cited

FOREIGN PATENT DOCUMENTS

| JP | A-2010-042519 | 2/2010 |
| JP | A-2010-082842 | 4/2010 |
| JP | A-2012-018681 | 1/2012 |
| JP | 2012-159563 A | 8/2012 |

OTHER PUBLICATIONS

Office Action from JP Application No. 2013-187382 dated Dec. 15, 2015.
Summons to attend oral proceedings mailed Apr. 18, 2016 in European Application No. 14183899.5.
Decision of Rejection from JP Application No. 2013-187382 mailed Jun. 14, 2016.

* cited by examiner

KEYBOARD MUSICAL INSTRUMENT

BACKGROUND OF THE INVENTION

1. Field of the Invention

The present invention relates to a keyboard musical instrument.

Priority is claimed on Japanese Patent Application No. 2013-187382, filed on Sep. 10, 2013, the content of which is incorporated herein by reference.

2. Description of Related Art

Typically, keyboard musical instruments including acoustic pianos such as grand pianos and upright pianos and electronic pianos include a fall board that covers a keyboard (for example, refer to Japanese Examined Utility Model Application, Second Publication No. H03-39825). In the related art, in an acoustic piano or an electronic piano having an appearance and design similar to that of an acoustic piano, a fall board is made of wood and has a predetermined thickness.

However, when the fall board is made of wood and has a predetermined thickness, the weight of the fall board is heavy, which causes a problem in that the fall board is not easily opened and closed.

The fall board disclosed in Japanese Examined Utility Model Application, Second Publication No. H03-39825 is made of a resin material. However, even if a fall board for an acoustic piano (or an electronic piano having a similar appearance and design) is made of a resin material, the weight of the fall board is still heavy. A configuration in which the thickness of a fall board of the above-described acoustic piano or the like is reduced to reduce the weight of the fall board can also be considered. In this case, however, the appearance and design of the acoustic piano or the like is poor.

In addition, in the related art, in order to allow a fall board of the acoustic piano or the like to be easily opened and closed, a configuration in which a damper structure is provided to the fall board is also disclosed. However, since the damper structure is exposed to the outside, the appearance and design of the acoustic piano or the like is poor. Further, since the damper structure is expensive, the manufacturing cost of the acoustic piano or the like increases.

SUMMARY OF THE INVENTION

The present invention has been made in consideration of the above-described circumstances, and an object thereof is to provide a keyboard musical instrument capable of reducing the weight of a fall board while maintaining a good appearance and design of the acoustic piano or the like.

In order to solve the above-described problems, according to an aspect of the present invention, there is provided a keyboard musical instrument including a fall board, in which the fall board is made of a resin plate-shaped body, and hollow portions are provided inside the plate-shaped body.

In the keyboard musical instrument according to the aspect of the present invention, the fall board is made of the resin plate-shaped body in which the hollow portions are formed. Since this plate-shaped body is lighter than wood, the weight of the fall board can be reduced. Accordingly, the fall board can be easily opened and closed.

In addition, by reducing the weight of the fall board with the hollow portions provided inside the plate-shaped body, the thickness of the fall board can be set to be the same as that of a fall board of the related art that is made of wood. Therefore, the appearance and design of the acoustic piano or the like can be prevented from being poor.

Further, the light fall board in which the hollow portions are provided inside the plate-shaped body can be manufactured at a lower cost as compared to a configuration of the related art in which a damper structure is used. Therefore, the manufacturing cost of the acoustic piano or the like in which the fall board can be easily opened and closed can be suppressed to be low.

In the above-described keyboard musical instrument, the plate-shaped body may include a plate-shaped resin foamed plate portion, and the hollow portions are made of air bubbles contained inside the resin foamed plate portion.

In addition, in the above-described keyboard musical instrument, the hollow portions may be made of a plurality of tube walls that are provided inside the plate-shaped body and extend in a thickness direction of the plate-shaped body.

Further, in the above-described keyboard musical instrument, the tube walls form a honey-comb structure.

In addition, in the above-described keyboard musical instrument, the hollow portions may be made of holes that are formed to extend in a direction perpendicular to a thickness direction of the plate-shaped body.

According to these configurations, the fall board can be efficiently manufactured using a molding method of the related art such as extrusion molding or injection molding.

In addition, in these configurations, although the hollow portions are formed inside the plate-shaped body, the stiffness of the plate-shaped body can be maintained. In particular, when the hollow portions are made of the tube walls that extend in the thickness direction of the plate-shaped body, and when the tube walls form a honey-comb structure, the stiffness of the plate-shaped body in the thickness direction can be particularly improved.

According to the present invention, by forming the hollow portions inside the resin plate-shaped body, the weight of the fall board can be reduced while maintaining a good appearance and design of the acoustic piano or the like.

In addition, the fall board can be easily opened and closed by reducing the weight of the fall board. Therefore, as compared to a case where a damper structure is used, the manufacturing cost of the acoustic piano or the like can be suppressed to be low.

DETAILED DESCRIPTION OF THE INVENTION

[First Embodiment]

Hereinafter, a first embodiment of the present invention will be described with reference to FIGS. 1 and 2.

Figure 1:
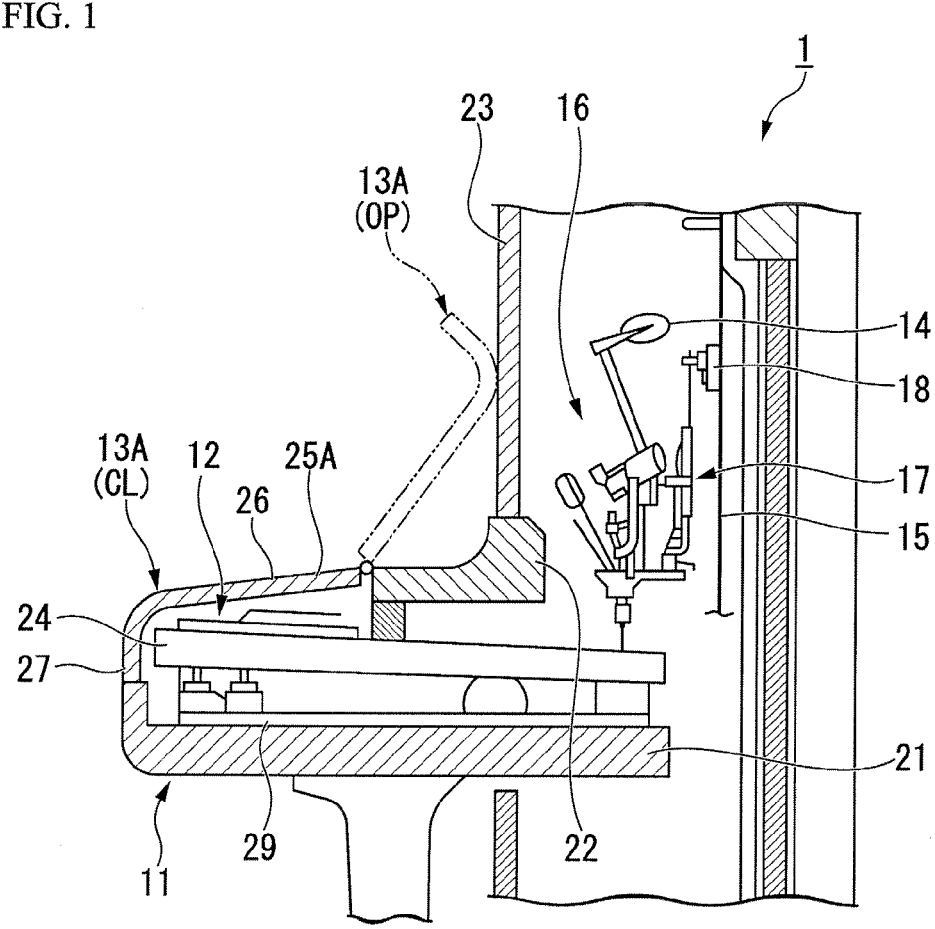
FIG. 1 is a side cross-sectional view illustrating a part of a piano according to a first embodiment of the present invention.

As illustrated in FIG. 1, a piano (keyboard musical instrument) 1 according to this embodiment is an upright piano which is an acoustic piano and has the same configuration as that of a piano of the related art. That is, the piano 1 includes a case 11, a keyboard 12, a fall board 13A, a hammer 14, a string (hitting target) 15, an action mechanism 16, and a damper mechanism 17.

In the keyboard 12, keys 24 which are hit by the fingers of the performer to play the piano are arranged. Each of the keys 24 is pivotably provided on a keybed 21 of the case 11 through a key frame 29.

An end portion (front end portion) of each of the keys 24 is exposed to the outside on a front surface side (left side in FIG. 1) of the case 11.

The fall board 13A covers a portion of the keyboard 12 which is exposed to the outside of the case 11, and is pivotably provided to an upper beam 22 of the case 11 between a cover position CL at which the keyboard 12 is covered and an open position OP at which the keyboard 12 is exposed to the outside.

The fall board 13A is made of a resin plate-shaped body 25A and includes: a first lid body plate portion 26 that covers a region above the keyboard 12; and a second lid body plate portion 27 that covers a front end (left end of the key in FIG. 1) of the keyboard 12. In the fall board 13A according to the embodiment, by forming the plate-shaped body 25A to be bent, the first lid body plate portion 26 and the second lid body plate portion 27 are integrally formed.

The hammer 14, the string 15, and the action mechanism 16 are provided inside the case 11. The hammer 14 hits the string 15. The action mechanism 16 is a mechanism in which a force of a finger of the performer pressing the key is converted into a force (hitting force) of the hammer 14 hitting the string 15.

The damper mechanism 17 is a mechanism in which the pressing force of the key 24 or a force of a foot of the performer pressing a loud pedal (not illustrated) is converted into a force of releasing a damper 18 on the string 15 from the string 15.

The above-described fall board 13A is positioned between the action mechanism 16 and the head (not illustrated) of the performer when the fall board 13A is disposed at the open position OP.

In the piano 1 according to the embodiment, the action mechanism 16 is positioned to be opposite the inside surface of an upper front plate 23 that forms a front surface side of the case 11 in a region above a rear end portion of the key 24 disposed inside the case 11. On the other hand, the fall board 13A disposed at the open position OP is positioned to cover the outside surface of the upper front plate 23. In addition, when the performer plays the piano, the head of the performer is positioned to be opposite the outside surface of the upper front plate 23 in a region above a front end portion of the key 24.

Figure 2:
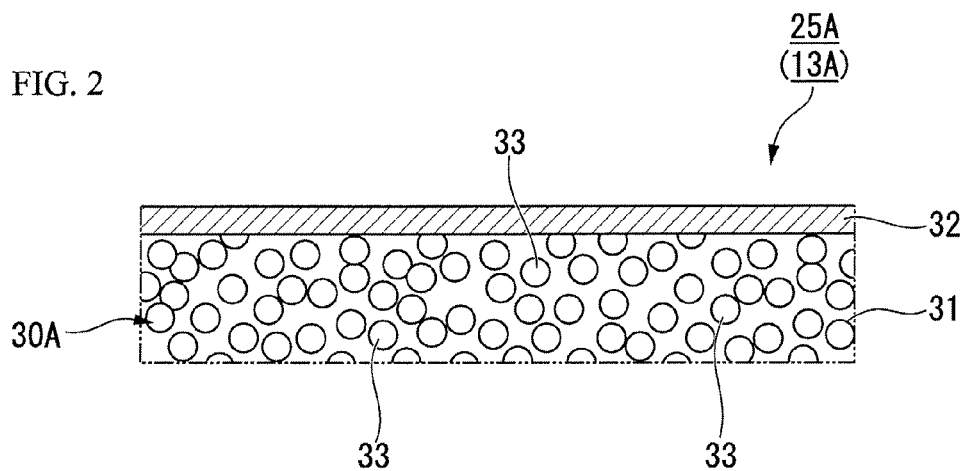
FIG. 2 is an enlarged cross-sectional view illustrating a fall board illustrated in FIG. 1.

As illustrated in FIG. 2, in the fall board 13A, hollow portions 30A are provided inside the plate-shaped body 25A. In the fall board 13A according to the embodiment, the plate-shaped body 25A includes a resin foamed plate portion 31 that is formed in a plate shape, and the hollow portions 30A are made of air bubbles 33 contained inside the resin foamed plate portion 31.

The resin foamed plate portion 31 is manufactured as follows. First, a foaming agent that produces gas when being heated (for example, sodium bicarbonate that produces carbon dioxide when being heated) is mixed with a base resin (for example, an ABS resin) to obtain a mixed resin material. This mixed resin material is supplied into a molding die of the fall board 13A, and the molding die is heated. As a result, air bubbles are formed in the mixed resin material, and the resin foamed plate portion 31 having the hollow portions 30A therein is obtained. An air bubble ratio in the resin foamed plate portion 31 (a ratio of the total volume of the air bubbles 33 to the total volume of the plate-shaped body 25A) is preferably set to be as high as possible within a range where the stiffness of the plate-shaped body 25A as the fall board 13A can be secured.

The air bubbles 33 may be present inside the resin foamed plate portion 31 in a state of being separated from each other or in a state of being linked to each other. In addition, for example, the air bubbles 33 may have an opening as illustrated in the drawing on the surface of the resin foamed plate portion 31 or may not have an opening thereon.

The plate-shaped body 25A according to the embodiment includes a resin surface layer 32 that is laminated on a surface of the resin foamed plate portion 31. The surface layer 32 covers the air bubbles 33 that have an opening on the surface of the resin foamed plate portion 31 as illustrated in the drawing. As a result, coating properties of the surface layer 32 on the surface of the plate-shaped body 25A are secured, and the surface layer 32 serves to obtain the fall board 13A having a good appearance and design. Accordingly, the surface layer 32 is preferably made of, for example, an ABS resin such that the surface roughness thereof decreases. Although not illustrated, for example, a resin coating layer and a clear layer (transparent resin layer) may be sequentially laminated on the surface layer 32.

The specific gravity of the resin material forming the plate-shaped body 25A (for example, the base resin forming the resin foamed plate portion 31) having the above-described configuration may be heavier than the specific gravity of, for example, wood.

The plate-shaped body 25A of the fall board 13A according to the embodiment having the above-described configuration can be molded by, for example, extrusion molding or injection molding. In order to efficiently mold the plate-shaped body 25A by extrusion molding, for example, a mold having a space corresponding to a cross-sectional shape of the plate-shaped body 25A perpendicular to the width direction thereof (arrangement direction of the keys 24) may be prepared to extrude the resin material of the plate-shaped body 25A from the space.

In addition, the plate-shaped body 25A according to the embodiment is formed by laminating resin layers (for example, the resin foamed plate portion 31 and the surface layer 32). Therefore, by molding the plate-shaped body 25A by multicolor molding such as two-color molding, the fall board 13A can be efficiently manufactured.

As described above, according to the fall board 13A of the embodiment and the keyboard musical instrument I including the same, the fall board 13A is made of the resin plate-shaped body 25A in which the hollow portions 30A are formed, and this plate-shaped body 25A is lighter than wood. Therefore, the weight of the fall board 13A can be reduced. Even if the specific gravity of the resin material forming the plate-shaped body 25A is heavier than the specific gravity of wood, by forming the hollow portions 30A inside the plate-shaped body 25A, the following effect can be obtained: when the fall board 13A made of the plate-shaped body 25A is formed in the same shape as that of a fall board of the related art made of wood, the weight of the fall board 13A can be reduced as compared to the fall board of the related art. Accordingly, the fall board 13A can be easily opened and closed.

In addition, by reducing the weight of the fall board 13A with the hollow portions 30A provided inside the plate-shaped body 25A, the thickness of the fall board 13A can be set to be the same as that of a fall board of the related art that is made of wood. Therefore, the appearance and design of the piano 1 can be prevented from being poor.

Further, the light fall board 13A in which the hollow portions 30A are provided inside the plate-shaped body 25A can be manufactured at a low cost as compared to a configuration of the related art in which a damper structure is used. Therefore, the manufacturing cost of the piano 1 in which the fall board 13A can be easily opened and closed can be suppressed to be low.

In addition, the fall board 13A according to the embodiment is made of the resin foamed plate portion 31. In addition, the fall board 13A is formed by laminating the surface layer 32 on the surface of the resin foamed plate portion 31 and thus can be efficiently manufactured using a molding method of the related art such as extrusion molding or injection molding. In addition, by appropriately adjusting the air bubble ratio of the resin foamed plate portion 31, the stiffness of the plate-shaped body 25A can be secured.

Further, the fall board 13A according to the embodiment is made of the resin plate-shaped body 25A and thus has an advantageous effect in that variations in the weight and the shape of the fall board 13A are small as compared to the fall board of the related art made of wood.

In addition, the fall board 13A according to the embodiment has the same appearance shape as that of the fall board of the related art and thus can be mounted on a piano of the related art. In other words, the fall board of the related art made of wood can be replaced with the fall board 13A according to the embodiment.

Further, in the fall board 13A according to the embodiment, the hollow portions 30A are provided inside the plate-shaped body 25A. Therefore, for example, as illustrated in FIG. 1, in a state where the fall board 13A is disposed at the open position OP and is positioned between the action mechanism 16 and the head (not illustrated) of the performer, even if a sound produced in the action mechanism 16 (sound produced along with the movement of each member of the action mechanism 16) is propagated toward the head of the performer, the sound is weakened by the fall board 13A including the hollow portions 30A by being absorbed by the hollow portions 30A. Accordingly, the sound of the action mechanism 16 can be prevented from reaching the ears of the performer, and an effect of allowing the performer to easily hear the piano I (sound produced based on a vibration of the string 15 hit by the hammer 14) is exhibited.

[Second Embodiment]

Next, a second embodiment of the present invention will be described with reference to FIG. 3.

In this embodiment, only a part of the structure of the fall board is different from that of the first embodiment, and the other configurations are the same as those of the first embodiment. In this embodiment, the same components as those of the first embodiment are represented by the same reference numerals, and the description thereof will not be repeated.

Figure 3:
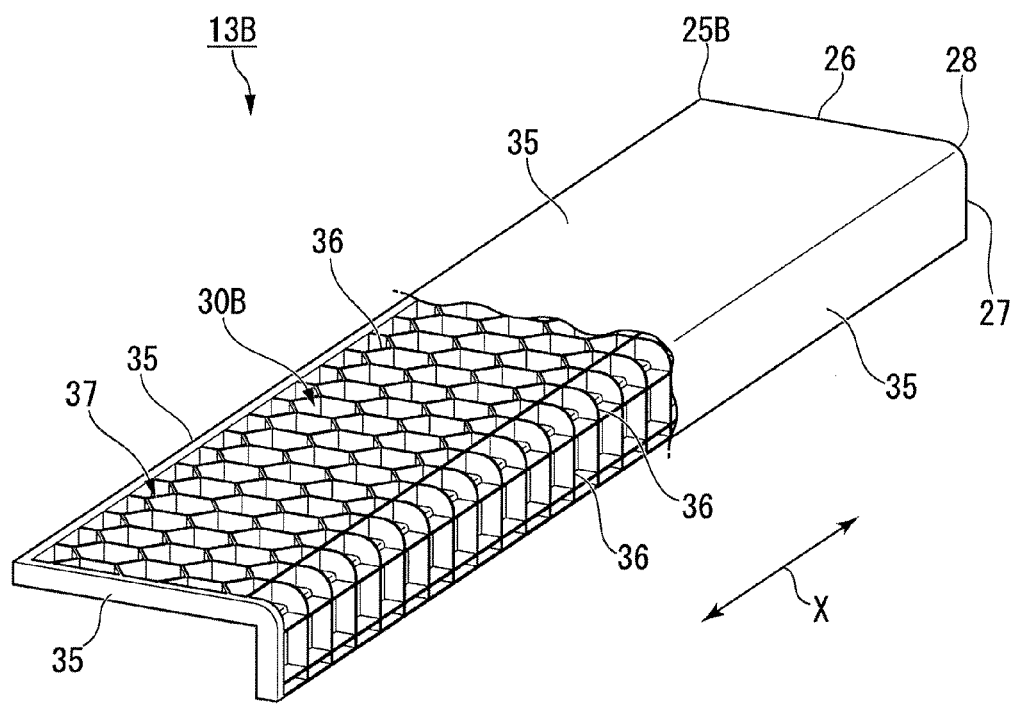
FIG. 3 is a partial cutaway perspective view illustrating a fall board according to a second embodiment of the present invention.

As illustrated in FIG. 3, as in the case of the first embodiment, a fall board 13B according to the embodiment is made of a resin plate-shaped body 25B and includes the first lid body plate portion 26 and the second lid body plate portion 27. In addition, in the fall board 13B according to the embodiment, by forming the plate-shaped body 25B to be bent, the first lid body plate portion 26 and the second lid body plate portion 27 are integrally formed. Further, in the fall board 13B according to the embodiment, hollow portions 30B are provided inside the plate-shaped body 25B.

In the fall board 13B according to the embodiment, the plate-shaped body 25B includes: an outer wall plate portion 35 that forms an outer shape of the plate-shaped body 25B; and tube walls 36 that are provided inside the plate-shaped body 25B and extend in a thickness direction of the plate-shaped body 25B. In addition, the hollow portions 30B of the plate-shaped body 25B are made of the tube walls (partition walls) 36. That is, the hollow portions 30B of the plate-shaped body 25B are formed as internal spaces of the tube walls 36. The tube walls 36 are disposed without a gap, and a part of the tube walls 36 is common to the adjacent hollow portions 30B.

Further, in the embodiment, the tube walls 36 which are provided inside the first lid body plate portion 26 of the plate-shaped body 25B are formed such that a shape seen from an axis direction thereof is a regular hexagonal shape. That is, the tube walls 36 provided inside the first lid body plate portion 26 form a honey-comb structure 37 having partition walls of a hexagonal tube. A center axis direction of this hexagonal tube matches with the thickness direction of the first lid body plate portion 26. That is, the wall portions (partition walls) of the hexagonal tube extend in the thickness direction of the first lid body plate portion 26 and are substantially perpendicular to a plane of the first lid body plate portion 26.

On the other hand, the tube walls 36 which are provided inside the second lid body plate portion 27 are formed such that a shape seen from an axis direction thereof is a rectangular shape (rectangular or square tube). A center axis direction of this square tube matches with the thickness direction of the second lid body plate portion 27. That is, the wall portions (partition walls) of the rectangular or square tube extend in the thickness direction of the second lid body plate portion 27 and are substantially perpendicular to a plane of the second lid body plate portion 27. The tube walls 36 provided inside the second lid body plate portion 27 are arranged in the width direction (X direction in FIG. 3) of the plate-shaped body 25B.

In addition, the tube walls 36 are also provided inside a bent plate portion 28 which is positioned between the first lid body plate portion 26 and the second lid body plate portion 27 in the plate-shaped body 25B. The tube walls 36 provided inside a bent plate portion 28 are formed to be curved along the bent shape of the bent plate portion 28 and are arranged in the width direction of the plate-shaped body 25B.

The thicknesses of the outer wall plate portion 35 and the tube walls 36 which form the plate-shaped body 25B are preferably set to be as small as possible within a range where the stiffness of the plate-shaped body 25B as the fall board 13B can be secured.

The fall board 13B according to the embodiment having the above-described configuration can be manufactured, for example, by molding divided pieces, into which the plate-shaped body 25B is divided in the thickness direction thereof, by injection molding and joining these divided pieces.

According to the fall board 13B of the embodiment, the same effects as those of the first embodiment are exhibited.

In addition, the fall board 13B of the embodiment can be efficiently manufactured by injection molding of the related art.

Further, according to the fall board 13B of the embodiment, the hollow portions 30B are made of the tube walls 36 that extend in the thickness direction of the plate-shaped body 25B. Therefore, the stiffness of the plate-shaped body 25B in the thickness direction can be improved. In particular, in the embodiment, the tube walls 36 provided inside the first lid body plate portion 26 form the honey-comb structure. That is, the shape of the tube walls 36 is a hexagonal tube, and the center axis of this hexagonal tube is arranged in the thickness direction of the first lid body plate portion 26. Therefore, the stiffness of the first lid body plate portion 26 in the thickness direction can be further improved to be higher than the stiffness of the second lid body plate portion 27.

In the fall board 13B according to the second embodiment, for example, the tube walls 36 provided inside the second lid body plate portion 27 may form the honey-comb structure as in the case of the first lid body plate portion 26.

In addition, for example, the configurations of the first embodiment may be applied to the fall board 13B according to the second embodiment. For example, the outer wall plate portion 35 of the plate-shaped body 25B according to the second embodiment may be formed by laminating a plurality of resin layers as in the case of the first embodiment.

[Third Embodiment]

Next, a third embodiment of the present invention will be described with reference to FIGS. 4 and 5.

In this embodiment, only part of the structure of the fall board is different from that of the first and second embodiments, and the other configurations are the same as those of the first embodiment. In this embodiment, the same components as those of the first embodiment are represented by the same reference numerals, and the description thereof will not be repeated.

Figure 4:
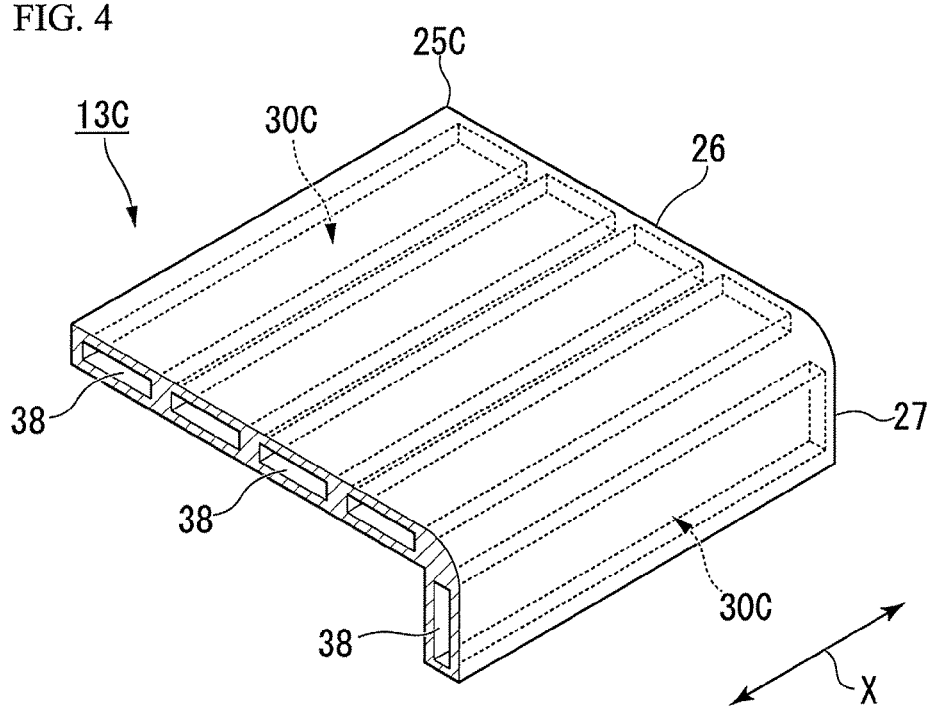
FIG. 4 is a perspective view illustrating a part of a fall board according to a third embodiment of the present invention.

As illustrated in FIG. 4, as in the case of the first and second embodiments, a fall board 13C according to the embodiment is made of a resin plate-shaped body 25C and includes the first lid body plate portion 26 and the second lid body plate portion 27. In addition, in the fall board 13C according to the embodiment, by forming the plate-shaped body 25C to be bent, the first lid body plate portion 26 and the second lid body plate portion 27 are integrally formed. Further, in the fall board 13C according to the embodiment, hollow portions 30C are provided inside the plate-shaped body 25C.

However, in the plate-shaped body 25C of the fall board 13C according to the embodiment, holes 38 that extend in a direction perpendicular to the thickness direction thereof are formed. In the embodiment, the hollow portions 30C of the plate-shaped body 25C are made of the holes 38. The holes 38 according to the embodiment extend in the width direction (X direction in FIG. 4) of the plate-shaped body 25C. In addition, the holes 38 are through holes that penetrate the plate-shaped body 25C. Further, a cross-section of the hole 38 is formed in a rectangular shape whose short sides are positioned in the thickness direction of the plate-shaped body 25C. In addition, the holes 38 are arranged at intervals.

Figure 5:
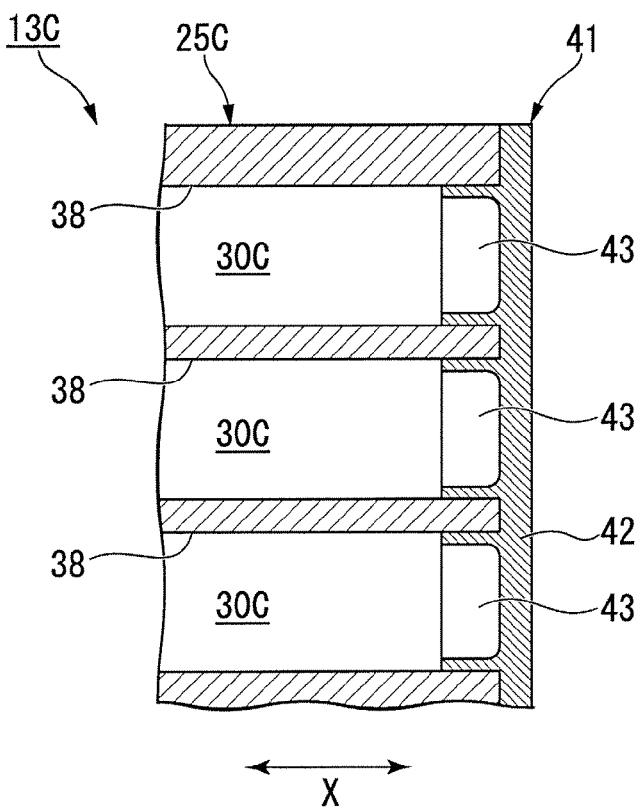
FIG. 5 is an enlarged cross-sectional view illustrating an end portion of the fall board illustrated in FIG. 4 in a width direction of a plate-shaped body.

Further, as illustrated in FIG. 5, the fall board 13C according to the embodiment includes a cap 41 that is provided at an end of the plate-shaped body 25C in the width direction (X direction in FIG. 5) and collectively closes openings of the holes 38. The cap 41 is made of a resin and is formed by integrally forming: a plate-shaped coating portion 42 that covers an end surface of the plate-shaped body 25C on which the holes 38 have openings; and fitting portions 43 that are fitted into the respective holes 38.

The plate-shaped body 25C of the fall board 13C according to the embodiment having the above-described configuration can be molded by, for example, extrusion molding or injection molding as in the case of the first embodiment. In addition, by mounting the cap 41 on the end portion of the plate-shaped body 25C in the width direction after molding the plate-shaped body 25C, the fall board 13C according to the embodiment can be obtained. When the cap 41 is mounted on the plate-shaped body 25C, the cap 41 may be bonded to the plate-shaped body 25C using, for example, an adhesive.

According to the embodiment, the same effects as those of the first embodiment are exhibited.

In addition, in the fall board 13C according to the embodiment, the hollow portions 30C of the plate-shaped body 25C are made of the holes 38 that penetrate the plate-shaped body 25C, and thus can be efficiently manufactured using a molding method of the related art such as extrusion molding or injection molding. In addition, by appropriately adjusting the shape and size of the holes 38, the stiffness of the plate-shaped body 25C can be secured.

Further, according to the fall board 13C of the embodiment, the openings of the holes 38 are closed by the cap 41. Therefore, a good appearance and design of the fall board 13C can be secured.

In addition, for example, the configurations of the first embodiment may be applied to the fall board 13C according to the third embodiment. For example, the plate-shaped body 25C according to the third embodiment may be formed by laminating a plurality of resin layers as in the case of the first embodiment.

Hereinabove, the present invention has been described in detail using the three embodiments. However, the present invention is not limited to the above-described embodiments, and various modifications can be made within a range not departing from the scope of the present invention.

For example, in the fall boards 13A to 13C according to the embodiments, the first lid body plate portion 26 and the second lid body plate portion 27 are made of the plate-shaped bodies 25A to 25C, respectively, but may be made of another plate-shaped body. In this case, the first lid body plate portion 26 and the second lid body plate portion 27 may be, for example, simply fixed to each other or may be rotatably linked to each other through, for example, a hinge.

Further, the present invention is applicable to, for example, a grand piano as well as an upright piano described in the embodiments.

In addition, the present invention is applicable to, for example, an electronic piano having an appearance and design similar to an acoustic piano as well as an acoustic piano such as an upright piano or a grand piano in which the string 15 is hit by the hammer 14. The present invention is particularly desirable for an electronic piano including the action mechanism 16, the hammer 14, and a hitting target (for example, a sensor for producing a sound) that is hit by the hammer 14 as in the case of an acoustic piano.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing a fall board, the method comprising:
   mixing a foaming agent, which produces gas when being heated, with a base resin to form a mixed resin material;
   supplying the mixed resin material to a molding die;

heating the molding die to allow a plurality of air bubbles to be formed inside the mixed resin material and to thereby obtain a resin foamed plate having a plurality of hollow portions therein; and laminating a resin surface layer on a surface of the resin foamed plate.

2. The method of manufacturing a fall board according to claim 1, wherein the base resin is an ABS resin.

3. The method of manufacturing a fall board according to claim 1, wherein the foaming agent is sodium bicarbonate.

4. The method of manufacturing a fall board according to claim 1, wherein the resin surface layer is made of an ABS resin.

* * * * *